United States Patent
Marchetto et al.

(10) Patent No.: US 7,091,687 B2
(45) Date of Patent: Aug. 15, 2006

(54) ELECTRICAL SYSTEM FOR CONTROLLING AT LEAST ONE GATE OR DOOR OR SIMILAR ELEMENT OF THE TYPE MOVED ELECTRICALLY

(75) Inventors: Oscar Marchetto, Oderzo (IT); Sergio Tomasella, San Polo di Piave (IT); Luigi Sandrin, Gaiarine (IT); Fulvio Cuzziol, San Biagio di Callalta (IT)

(73) Assignee: MHouse SRL, Oderzo (IT)

( * ) Notice: Subject to any disclaimer, the term of this patent is extended or adjusted under 35 U.S.C. 154(b) by 0 days.

(21) Appl. No.: 10/515,436
(22) PCT Filed: Jun. 2, 2003
(86) PCT No.: PCT/EP03/05900

§ 371 (c)(1),
(2), (4) Date: Nov. 23, 2004

(87) PCT Pub. No.: WO03/104907

PCT Pub. Date: Dec. 18, 2003

(65) Prior Publication Data

US 2005/0179319 A1 Aug. 18, 2005

(30) Foreign Application Priority Data

Jun. 6, 2002 (IT) ............................ MI2002A1234

(51) Int. Cl.
*G05B 11/32* (2006.01)
(52) U.S. Cl. ................. 318/466; 318/445; 318/280; 318/282; 318/286; 340/825.57; 340/825.59; 340/825.6
(58) Field of Classification Search .............. 318/466, 318/286, 445, 280, 282; 49/26, 28; 340/825.57, 340/825.59, 825.6
See application file for complete search history.

(56) References Cited

U.S. PATENT DOCUMENTS

| | | | | | |
|---|---|---|---|---|---|
| 4,497,031 | A | * | 1/1985 | Froehling et al. | 700/276 |
| 4,709,233 | A | * | 11/1987 | Duval | 340/825.59 |
| 5,089,974 | A | * | 2/1992 | Demeyer et al. | 340/3.41 |
| 5,299,385 | A | * | 4/1994 | McConnell | 49/18 |
| 5,410,292 | A | | 4/1995 | Le Van Suu | 340/310.06 |
| 5,428,923 | A | * | 7/1995 | Waggamon | 49/28 |
| 5,621,662 | A | * | 4/1997 | Humphries et al. | 700/276 |
| 5,684,449 | A | * | 11/1997 | Le Van Suu | 340/310.01 |
| 5,689,242 | A | * | 11/1997 | Sims et al. | 340/652 |
| 5,710,712 | A | * | 1/1998 | Labun | 700/286 |
| 5,805,926 | A | * | 9/1998 | Le Van Suu | 710/16 |
| 6,107,912 | A | * | 8/2000 | Bullock et al. | 340/310.01 |
| 6,519,125 | B1 | * | 2/2003 | Graube | 379/399.01 |
| 6,525,915 | B1 | * | 2/2003 | Graube | 361/58 |
| 6,560,279 | B1 | * | 5/2003 | Renz | 375/237 |
| 6,665,308 | B1 | * | 12/2003 | Rakib et al. | 370/441 |

FOREIGN PATENT DOCUMENTS

EP 0624541 A2 11/1994

* cited by examiner

*Primary Examiner*—Rita Leykin
(74) *Attorney, Agent, or Firm*—Wenderoth, Lind & Ponack, L.L.P.

(57) ABSTRACT

An electrical system for controlling at least one gate or door or similar element of the type moved by means of at least one corresponding electric motor includes an electric network (NTWRK) consisting of two electric wires adapted to allow the distribution of direct-current power supply and digital information, a central control unit (UC) having two terminals (T1,T2) adapted to be connected respectively but indifferently to the two wires of the network (NTWRK) in order to transmit direct-current power supply and to transmit and receive digital information, a certain number of peripheral units (UP), each having two terminals (T1,T2) adapted to be connected respectively but indifferently to the two wires of the network (NTWRK) in order to receive direct-current power supply and to receive and/or transmit digital information.

63 Claims, 6 Drawing Sheets

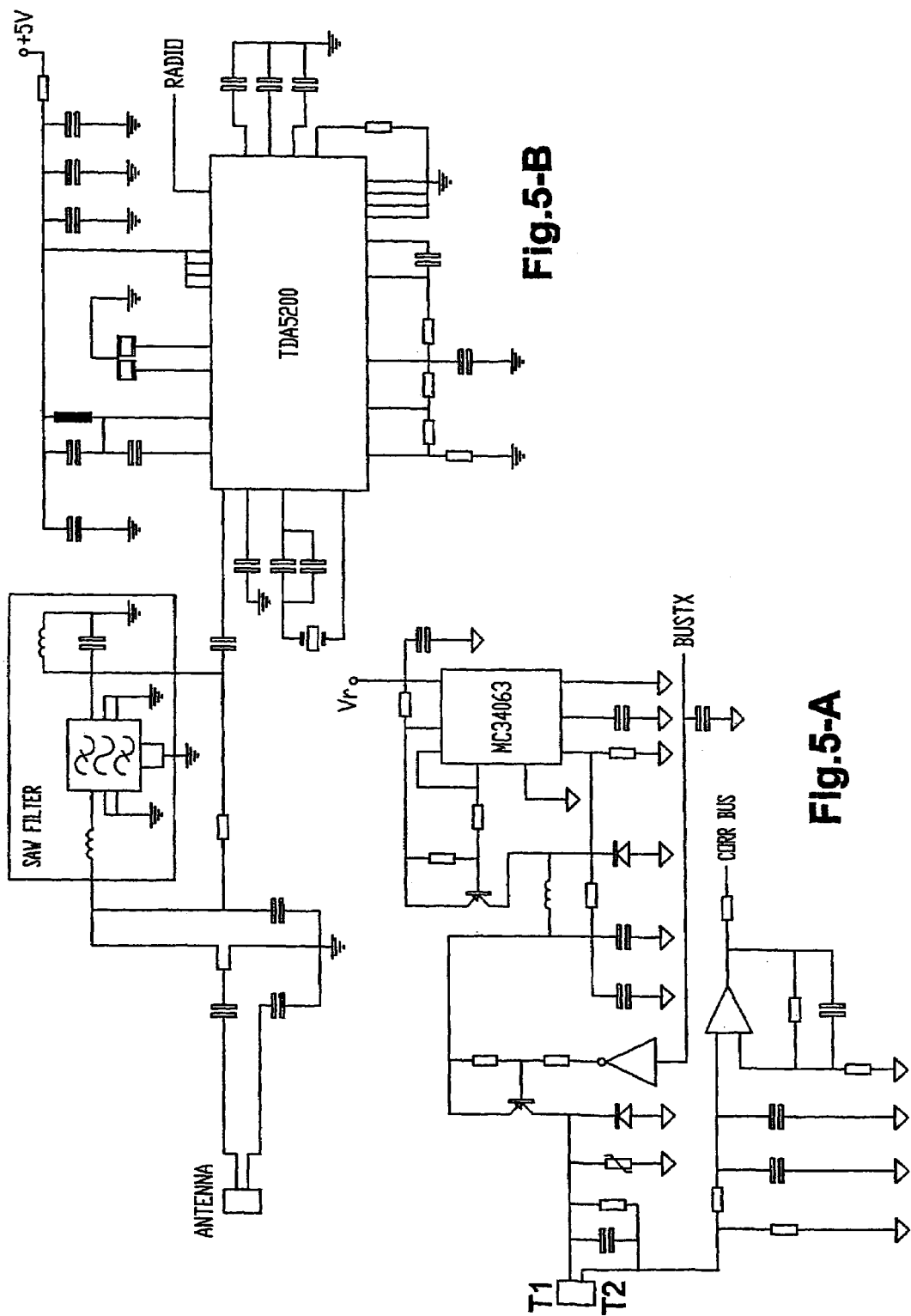

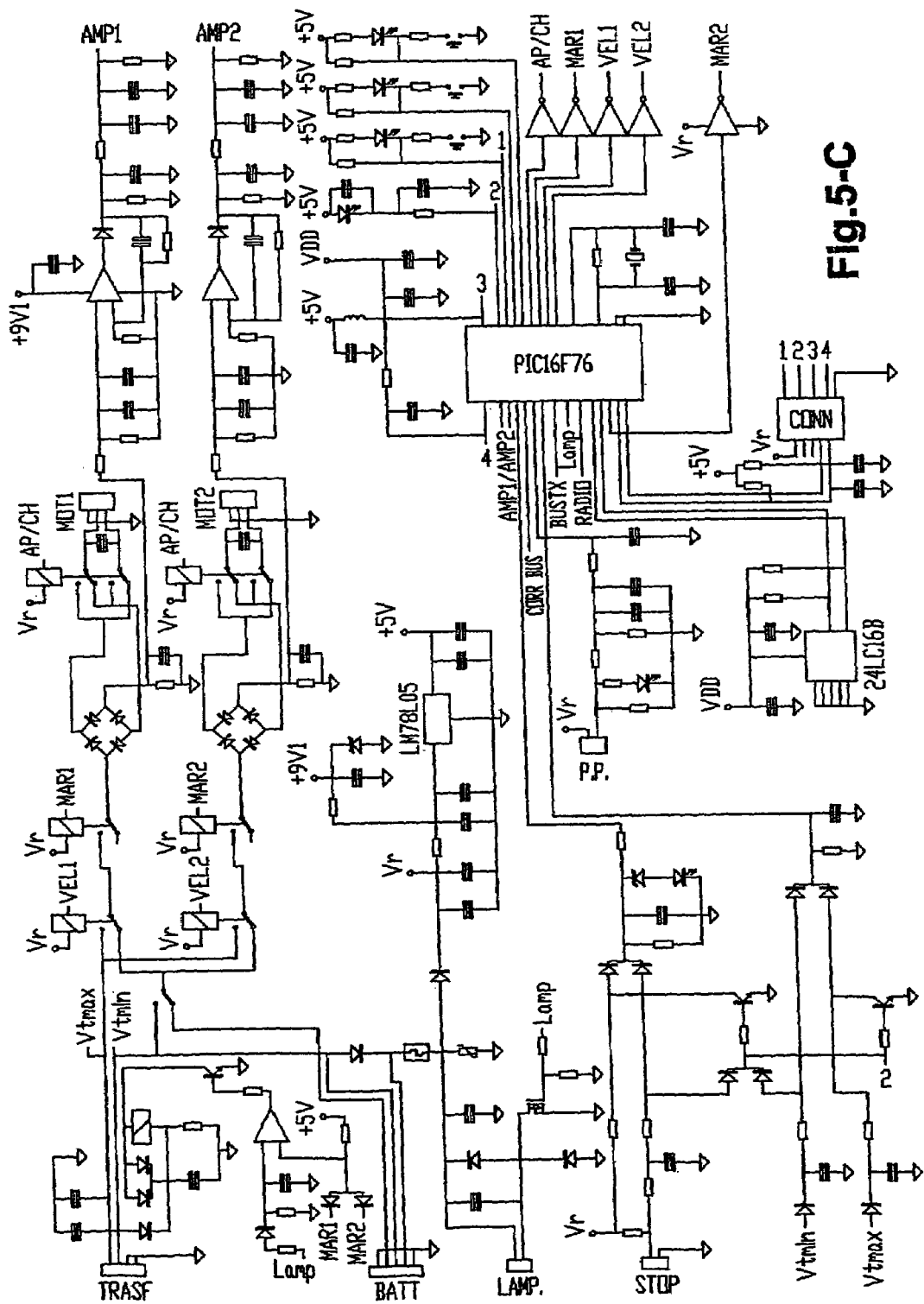

ELECTRICAL SYSTEM FOR CONTROLLING AT LEAST ONE GATE OR DOOR OR SIMILAR ELEMENT OF THE TYPE MOVED ELECTRICALLY

FIELD OF THE INVENTION

The present invention relates to an electrical system for controlling at least one gate or door or similar element of the type moved by means of at least one corresponding electric motor.

BACKGROUND OF THE INVENTION

In electrical systems for controlling an entrance gate and/or a garage door of a dwelling, it is typical to locate the various units which make up the system where it is necessary and connect them through electric wires.

In a dwelling, the following, for example, may be installed: a motor for one wing of the gate, a motor for the other wing of the gate, a motor for the garage door, a radio receiver for receiving requests for movement of the gate and of the door coming from remote control transmitters, key-operated selectors and/or command keypads for operating the gate or the door, various safety photocell systems (each photocell system is composed of a receiver and a transmitter), and luminous and/or acoustic devices for signalling the movement of the gate and the door.

Until a short time ago, the number of devices installed was fairly small (four or five) and these devices, for the sake of simplicity, were located very close to each other, for example next to the gate.

Recently, international safety regulations, on the one hand, and the requirements of users, on the other hand, have resulted in a considerable increase in the number of devices installed (often ten or so or even more) and in the impossibility of locating them close to each other; this tendency will continue in the future.

The specific sector of doors and gates for garages for commercial and industrial premises is governed at a European level by CEN standard prEN 13241.

Installed devices of this kind are electrically connected to the electrical control system; more precisely, generally these devices are connected directly and locally to the peripheral units of the electrical control system, which units are connected directly, by means of electric wires, to the central unit of the electrical control system, the "heart" of the system.

In these systems, therefore, many electric wires are required.

Just because of the type of application, there are many such electric wires and they are often very long (various tens of meters and, in some case, even hundreds of meters) and therefore their cost is generally fairly high; moreover, the cost of installing them (usually underground, preferably inside protective pipes) must be taken into consideration.

Again, because of the type of application, these electric wires are positioned outdoors, underground and sparsely (since there are substantially no spatial constraints), and therefore, the risk of cutting one of them, for example when working in a garden, is quite possible.

Moreover, the plurality of electric wires associated with different installed devices results in a complex electrical system and easily gives rise, during installation, to errors in connection (both with regard to the polarity of the wires and with regard to the correspondence between wires and connectors) even on the part of qualified personnel.

A solution to the abovementioned problems, which is of interest from a practical point of view, must be simple (both in terms of the connections and in terms of apparatus), relatively inexpensive and must not require either specialized knowledge or particular skill on the part of the personnel responsible for installation of the system.

SUMMARY OF THE INVENTION

The object of the present invention is that of providing a solution to the abovementioned problems which takes into account the abovementioned considerations.

This object is essentially achieved by the electrical control system having the characteristic features described in Claim 1, Claim 2 or Claim 3.

Further advantageous aspects of the system according to the present invention are described in the dependent claims.

The basic idea of the present invention is that of using an electric network consisting of only two electric wires for the entire system, which are adapted to distribute both direct-current power supply and digital information, and of imposing no constraint on the connection between the equipments of the system and the network of the system.

BRIEF DESCRIPTION OF THE DRAWINGS

The invention will become more apparent from the description which follows, considered together with the accompanying drawings, in which:

FIG. 5 shows an electrical diagram of a central unit according to the present invention divided into three parts (FIG. 5-A, FIG. 5-B, FIG. 5-C);

DETAILED DESCRIPTION OF THE INVENTION

With (non-limiting) reference to FIG. 2, the electrical control system according to the present invention has the function of controlling at least one gate or door or similar element (below reference will often be made to a gate for the sake of simplicity of the description) of the type moved by means of at least one corresponding electric motor; the system comprising:

a) an electric network NTWRK consisting of two electric wires adapted to allow distribution of power supply and digital information;

b) a central control unit UC having two terminals T1,T2 adapted to be connected respectively but indifferently to the two wires of the network NTWRK in order to transmit direct-current power supply and to transmit and receive digital information;

c) a certain number of peripheral units UP, each having two terminals T1,T2 adapted to be connected respectively but indifferently to the two wires of the network NTWRK in order to receive direct-current power supply and to receive and/or transmit digital information.

Figure 2:
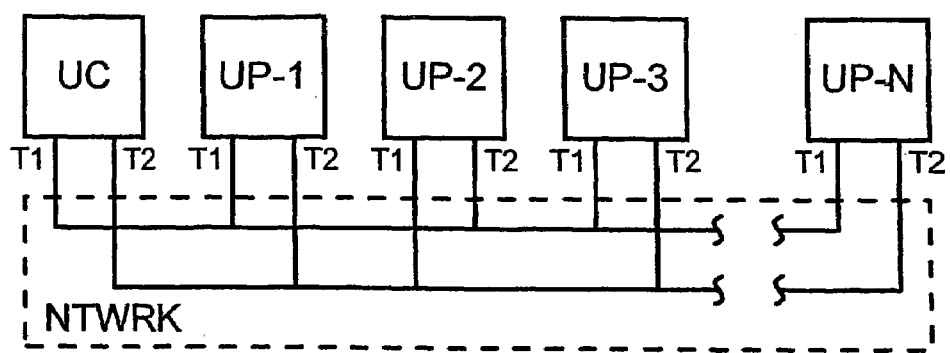
FIG. 2 shows a conceptual diagram of a system according to the present invention.

FIG. 2 conceptually shows N peripheral units UP indicated by UP-1, UP-2, UP-3, . . . UP-N.

Figure 1:
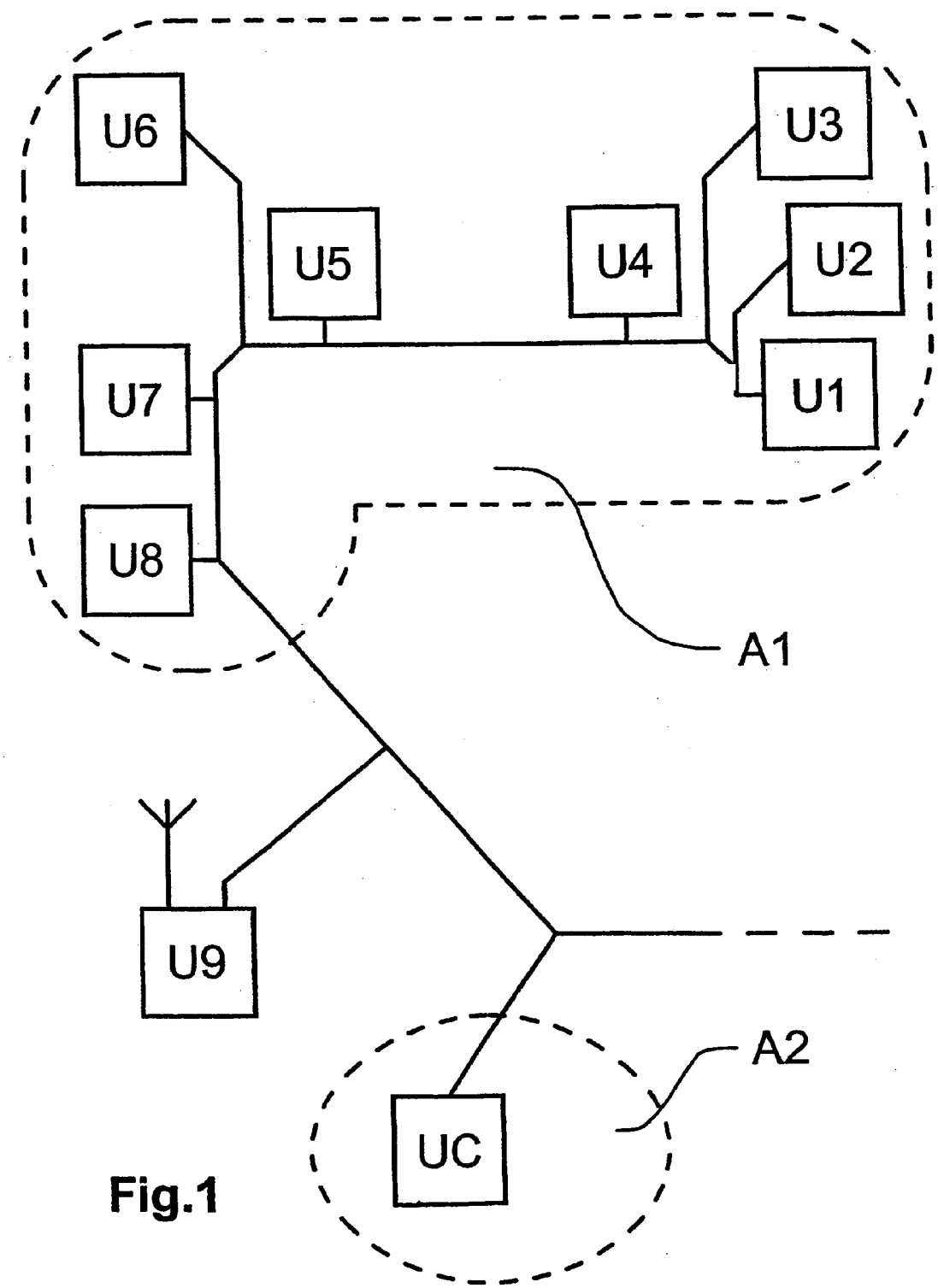
FIG. 1 shows a diagram of a fairly complicated system according to the present invention.

The network NTWRK according to the present invention, with its two wires, may comprise branches, as can be clearly seen in the diagram of FIG. 1. Also in the complicated diagram of FIG. 1, the electric wires are conceptually only two in number; basically, these wires will probably be formed by means of a series of twin-wire cable sections which are suitably connected together.

As can be seen from the diagram according to FIG. 1, the wiring is very simple, the number of wires is minimal (two both for the power supply and for the information) and the length of the wires is minimal if installation is performed properly (branches limited to the minimum necessary).

The units are all connected together (in parallel) on the network NTWRK and without the need to take into account the polarity; it is therefore not possible to make mistakes during connection since there are no constraints.

The power supply may be obtained in the form of direct current directly from the network NTWRK; this power supply is designed mainly for the peripheral units which make up the system and which may therefore be extremely simplified from the point of view of the power supply. These peripheral units may then in turn provide a power supply to the devices to which they are connected and which may therefore be simplified greatly from the point of view of the power supply.

The circuit which generates the power supply for the network NTWRK (and therefore for the peripheral units and if necessary for the devices connected to the latter) is generally located inside the housing which contains the central unit UC.

Depending on the type of device to which a peripheral unit is connected, the latter may have the need only to receive digital information (such as conceptually, for example, a luminous signalling device), only to transmit digital information (such as conceptually, for example, a safety device) and both to receive and transmit digital information (as will be clarified below).

Such an electrical control system must be connected to at least three essential devices: an electric motor for moving the gate, a device for entering requests for movement of the gate (for example a key-operated selector, a command keypad, a remote control receiver, etc.), a safety device (for example, a photocell system, a sensitive edges system, a mat presence detector, a radar presence detector, etc.).

Depending on the functions performed by the central unit UC, three designs of the present invention are possible.

According to a first embodiment, the system comprises at least three peripheral units, each of which have terminals adapted to be connected respectively but indifferently to the two wires of the network in order to receive direct-current power supply and to receive and/or transmit digital information; wherein one of the peripheral units is adapted to be electrically connected to an electric motor for controlling operation thereof; wherein one of the peripheral units is adapted to be electrically connected to a device for entering requests for movement of the gate or door or similar element; wherein one of the peripheral units is adapted to be electrically connected to a safety device for gates or doors or similar elements.

In other words, according to this first embodiment, the three essential devices are connected electrically to three different peripheral units.

According to a second embodiment, the system comprises at least two peripheral units, each having two terminals adapted to be connected respectively but indifferently to the two wires of the network in order to receive direct-current power supply and to receive and/or transmit digital information; wherein the central unit is adapted to be electrically connected to an electric motor for controlling operation thereof and/or to a device for entering requests for movement of the gate or door or similar element and/or to a safety device for gates or doors or similar elements; wherein a peripheral unit is adapted to be electrically connected to an electric motor for controlling operation thereof and/or to a device for entering requests for movement of the gate or door or similar element and/or to a safety device for gates or doors or similar elements; wherein another peripheral unit is adapted to be electrically connected to an electric motor for controlling operation thereof and/or to a device for entering requests for movement of the gate or door or similar element and/or to a safety device for gates or doors or similar elements.

In other words, according to this second embodiment, one of the essential devices is connected electrically directly to the central unit, while the other two essential devices are connected electrically to two different peripheral units.

According to a third embodiment, the system comprises at least one peripheral unit having two terminals adapted to be connected respectively but indifferently to the two wires of the network in order to receive direct-current power supply and to receive and/or transmit digital information; wherein the central unit is adapted to be electrically connected to an electric motor for controlling operation thereof and/or to a device for entering requests for movement of the gate or door or similar element and/or to a safety device for gates or doors or similar elements; wherein the peripheral unit is adapted to be electrically connected to an electric motor for controlling operation thereof and/or to a device for entering requests of movement of the gate or door or similar element and/or to a safety device for gates or doors or similar elements.

In other words, according to this third embodiment, two of the essential devices are connected electrically directly to the central unit, while the third essential device is connected electrically to a peripheral unit.

In all three embodiments, it is possible to provide many other peripheral units to be connected electrically to additional devices, for example: other motors, other input devices, other safety devices, signalling devices, etc.

In all three embodiments, it is also possible to provide additional devices that are connected electrically directly to the central unit.

The diagram in FIG. 1 shows a system according to the present invention which is fairly complicated. An area A1 of the garden where an entry gate is located contains a peripheral unit U1 for the receiver of a first photocell system, a peripheral unit U2 for a flashing device, a peripheral unit U3 for the receiver of a second photocell system, a peripheral unit U4 for a motor operating the right-hand wing of the gate, a peripheral unit U5 for a motor actuating the left-hand wing of the gate, a peripheral unit U6 for the transmitter of the second photocell system, a peripheral unit U7 for the transmitter of the first photocell system, and a peripheral unit U8 for a key-operated selector of the gate. An area A2 of the dwelling contains only the central unit UC. Finally, a peripheral unit U9 is provided for a remote control receiver in a point such as to receive without difficulty the remote control signals. The twin-wire network NTWRK connects electrically all these units sparsely located in an optimum manner. Obviously other peripheral units for other devices could be connected to the network NTWRK; this is indicated by a section in broken lines.

The basic idea of the present invention, namely that of using an electric network consisting of only two electric wires for the entire system, which are adapted to allow distribution of both direct-current power supply and digital information, and of imposing no constraints on the connection between the equipments of the system and the network of the system, requires the use of suitable circuitry inside the control unit UC and the peripheral units UP.

Figure 3:
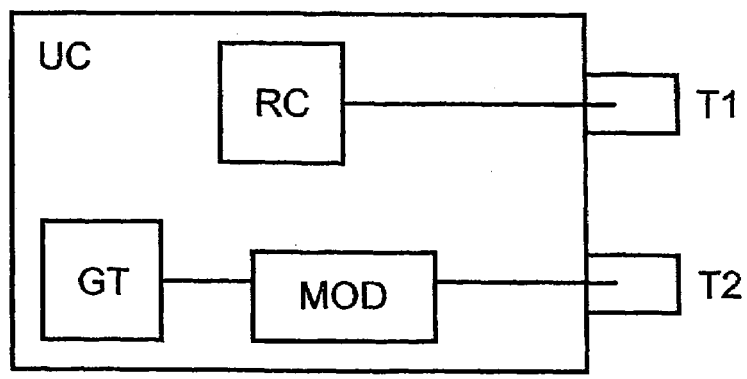
FIG. 3 shows a block diagram of a central unit according to the present invention.

With reference to FIG. 3, a possible advantageous structure of a central unit UC which can be used in the system according to the present invention will be described below.

This central unit UC comprises a voltage generator circuit GT having an output coupled to one of the two terminals T1,T2 of the central unit (in the example, terminal T2) and adapted to generate a direct power supply voltage (for example +12 volts) and a modulating circuit MOD coupled between this output and this terminal and adapted to modulate the direct supply voltage through digital information.

The most simple modulation to be performed in this case is ON/OFF modulation: for example, when the central unit UC transmits a digital value "1"="high", the difference in potential between the two wires of the network NTWRK will be approximately equal to +12 volts and when the central unit UC transmits a digital value "0"="low", the difference in potential between the two wires of the network will be approximately equal to 0 volts.

The central unit UC may comprise further a current detector circuit RC having an input coupled to another one of the two terminals T1,T2 of the central unit (in the example terminal T1) and adapted to extract digital information from the current at its input; since the circuit RC will have an influence on the potential difference between the two wires of the network NTWRK, the voltage drop caused by it must be small.

Figure 4:
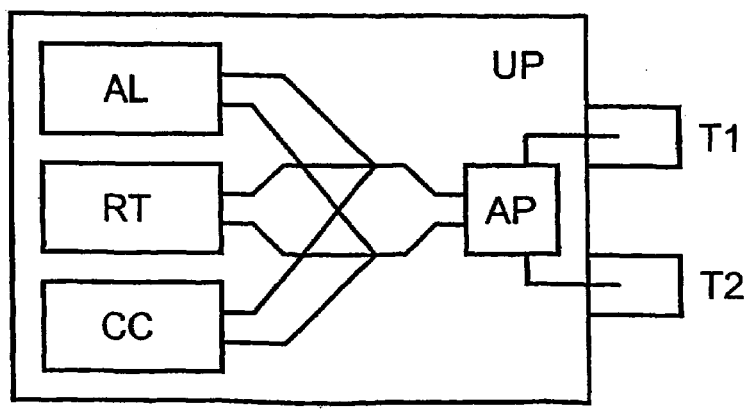
FIG. 4 shows a block diagram of a peripheral unit according to the present invention.

With reference to FIG. 4, a possible advantageous structure of a peripheral unit UP which can be used in the system according to the present invention will be described below.

This peripheral unit UP comprises a polarity adapter circuit AP having two inputs and two outputs, the two inputs being coupled respectively to the two terminals T1,T2 of the peripheral unit. Therefore, at the outputs of the circuit AP there will be electric signals having a predetermined polarity irrespective of the polarity of the electrical signals at the terminals T1,T2.

The peripheral unit UP may further comprise a power supply circuit AL having inputs coupled respectively to the outputs of the polarity adapter circuit AP. This circuit may be fairly simple since it is already possible to draw from the network NTWRK a direct voltage (for example +12 volts) with the correct polarity owing to the circuit AP. It only remains to eliminate, therefore, the effects of transmission by the central unit UC and any disturbances.

The peripheral unit UP may further comprise a voltage detection circuit RT having inputs coupled respectively to the outputs of the polarity adapter circuit AP and adapted to extract digital information from the voltage at its inputs. If the central unit UC modulates ON/OFF the voltage on the network NTWRK, this signal is substantially already ready to be sampled and discriminated by the peripheral unit UP. For example, if the sample has a voltage value greater than +8 volts it will correspond to a digital value "1"="high" and if the sample has a voltage value less than +4 volts it will correspond to a digital value "0"="low".

The peripheral unit UP may further comprise a load circuit CC having outputs coupled respectively to the outputs of the polarity adapter circuit AP and adapted to load it according to digital information. A simple way of doing this is to adopt an ON/OFF approach in this case also: for example, when the peripheral unit UC wishes to transmit a digital value "1"="high", the circuit CC applies to the network (by means of the circuit AP) a load which causes an additional current flow on the network NTWRK and, when the peripheral unit UC wishes to transmit a digital value "0"="low", the circuit CC does not apply any load to the network and therefore does not cause any additional current flow on the network NTWRK. These differences in current are detected by the circuit RC of the central unit UC.

All the peripheral units UP are connected in parallel to the network NTWRK and it is therefore necessary, during design of the voltage generator GT of the central unit UC, to take into account the current consumed by all the connected circuits AL, RT, CC.

According to a preferred embodiment of the present invention, the transmission of digital information both in voltage form from the central unit UC to the peripheral units UP and in current form from the peripheral units UP to the central unit UC uses the PWM (Pulse Width Modulation) ⅓–⅔ approach. Each bit has a predetermined duration considered unitary: if the pulse lasts less than one third of this predetermined duration, the bit has a logic value, for example, "0", whereas if the pulse lasts more than two thirds of this predetermined duration, the bit has a logic value, for example "1".

For the sake of completeness of the description, some detailed electrical diagrams of specific embodiments of parts of the system according to the present invention have been appended to the present description.

FIG. 5 shows the electrical diagram of a central unit according to the present invention divided into three parts FIG. 5-A, FIG. 5-B and FIG. 5-C. FIG. 5-A shows the interface part of the central unit with the network NTWRK; FIG. 5-B shows the radio section of the remote control receiver of the central unit; and FIG. 5-C shows the remaining part of the central unit.

Figure 6:
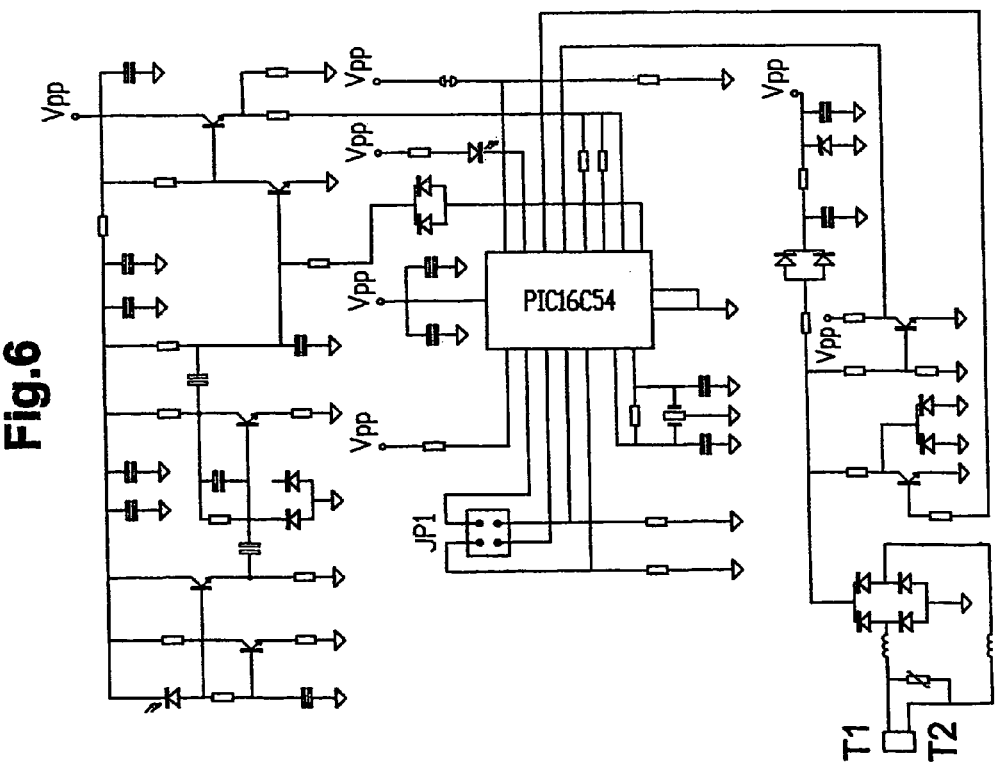
FIG. 6 shows an electrical diagram of a peripheral unit according to the present invention.

FIG. 6 shows the electrical diagram of a peripheral unit adapted to be connected to a receiver of a photocell system and to the network NTWRK.

Figure 7:
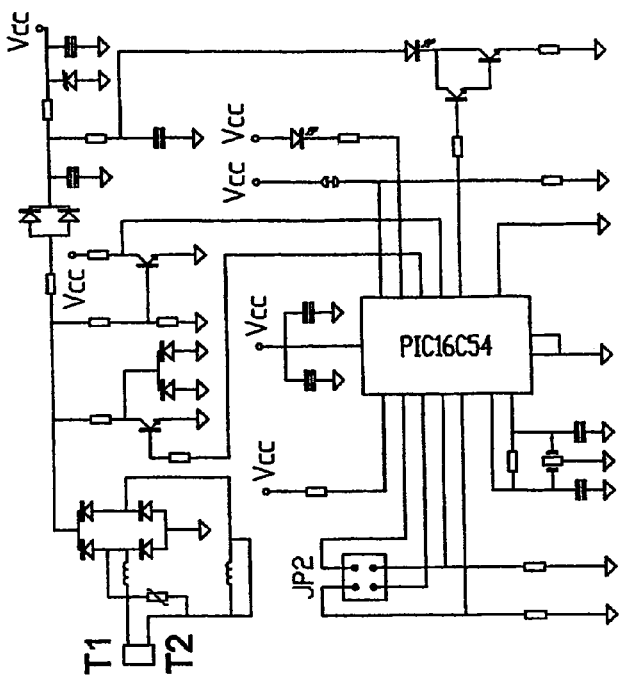
FIG. 7 shows an electrical diagram of another peripheral unit according to the present invention.

FIG. 7 shows the electrical diagram of a peripheral unit adapted to be connected to the transmitter of a photocell system and to the network NTWRK.

Below, aspects of the present invention which are more closely linked with operation of the system will be described.

In order to be adapted to exchange digital information correctly and efficiently, it is advantageous for each of the peripheral units to comprise memory means adapted to store an own unit identification code which may be used as an address. These memory means may consist of a conventional semiconductor memory (of the EPROM, EEPROM, FLASH or RAM type) or, more simply, of dip switches or also, even more simply, of jumpers. The choice depends both on cost criteria and on installation criteria: in fact the unit identification code may be determined either during production or during installation and may be fixed or variable.

In the specific examples according to FIG. 6 and FIG. 7, for example, the code is determined by one or more jumpers and by four contacts arranged in the corners of a square: if there are two jumpers, these may be connected both horizontally, both vertically, or one horizontal and one vertical in four different ways: if there is only one jumper it may be connected horizontally at the top, horizontally at the bottom, vertically on the right and vertically on the left.

For the safety devices consisting of a transmitting section and a receiving section (which are generally located well apart from each other), for example photocell systems, two associated peripheral units may be provided, being adapted to be connected respectively to the transmitting section and to the receiving section and being identified by the same unit identification code. In this way, if the central unit needs to transmit digital information to the photocell system (for example a status reading request), a single transmission to the same address may be effected.

A particularly effective and efficient solution for establishing communication between a central unit and peripheral units consists in exchanging packets of digital information using the "master-slave" technique, wherein the central unit operates as the "master" and the peripheral units operate as "slaves". In other words, a peripheral unit waits to be interrogated by the central unit before transmitting a packet of digital information.

Depending on the type of device connected to the peripheral unit, when a peripheral unit receives a packet from the central unit, it might not be strictly necessary for the peripheral unit to transmit a response packet to the central unit. This typically occurs when the central unit transmits to the peripheral unit a command for activating a motor or a signalling device. For the central unit, however, it is advantageous that a response should be transmitted in any case; in fact, for example, this response packet could contain the information that the command has been carried out successfully, wherein failure to receive this confirmation could activate repetition of the transmission.

In the case of the "master-slave" technique, in order to ensure ordered communication between the central unit and peripheral units, the central unit may advantageously be adapted to transmit packets on the network at a fixed and predetermined rate, for example one every 10 or 20 or 30 ms.

In this case it is necessary to decide to whom the packets are to be addressed. Many criteria may be used, where on the one hand, it is necessary for the central unit to interrogate with a certain frequency the peripheral units connected to the input devices so as to be able to realize of any requests for opening or closing, and on the other hand, it is necessary for the central unit to control suitably (by means of the peripheral units) the motor and the signalling devices. Also, the central unit must interrogate with a certain frequency, during the movement of the motor, the peripheral units connected to the safety devices in order to realize of dangerous situations. Below other considerations which may influence the choice of destination will be clarified.

One or more of the peripheral units may be adapted to extract timing information from the fixed-rate transmission of packets by the central unit. In fact, fixed-rate transmission, in addition to ensuring ordered communication within the system, distributes a unique timing information which is valid for the whole network and on the basis of which synchronization may be performed, if necessary.

It is reasonable that the length of the packets which are transferred within the network NTWRK should be the same, in particular for the packets transmitted from the peripheral units. The structure of the packets transmitted from the central unit may, if necessary, differ from the structure of the packets transmitted from the peripheral units. In view of the type of application, the structure of the digital information packet may in any case be extremely simple: the packet from the central unit may consist, for example, essentially of a combination of the code of the peripheral unit and a sequence of one or two or three bits which identify a command, while the packet from the peripheral units may consist, for example, essentially only of short sequence of data bits.

In order to facilitate greatly the installation of the system, the central unit may be adapted to perform, during starting or re-starting of the system, identification of all the active peripheral units connected to the network by means of an exchange of packets; thus the central unit determines autonomously the composition of the system.

In order to obtain a diagnostics procedure for the system, the central unit may be adapted to perform, repeatedly during operation of the system, identification of all the active peripheral units connected to the network by means of an exchange of packets. By comparing the list of active peripheral units upon start-up of the system with the list of peripheral units which are active at a certain moment, it is possible to obtain, after any appropriate verification, identification of the faulty or isolated peripheral units. In connection with the faulty or isolated peripheral unit, the peripheral unit may decide to take suitable measures (light up a lamp, stop the system, activate an alarm).

By suitably choosing the unit identification codes and the structure of the digital information packets (and obviously the software inserted in the central control unit), it is possible to program the central unit by means of a programming device connected to a particular peripheral unit identified by a reserved identification code.

The present invention has been described hitherto with reference to entrance gates and garage doors for homes, but it is obvious that it is applicable and its protection therefore extends to other similar closing elements, in particular other types of gates and doors; for example, problems similar to those mentioned arise in the sector of road barriers and shutters for factories and shops.

An important aspect of an electrical system for controlling a closing element which is moved electrically is the reliability regarding the exchange of digital information. In some cases, problems with regard to exchange could result in undesirable occurrences (for example, failure of the gate to open), but in other cases could also result in serious accidents (for example, a person being trapped between the wings of a gate).

Errors in the exchange of information are primarily due to disturbances in the system network which overlap with the electrical data signals generated within the network itself. The errors may also be due to overlapping of two transmission operations performed by two different units of the system.

In a system such as that described above, a first measure which can be adopted in order to improve the reliability of data exchange, in particular in order to avoid errors due to overlapping, is that of using the "master-slave" technique (already mentioned above). In fact, the peripheral units transmit only upon a request from the central unit and the central unit interrogates only one peripheral unit at a time.

In a system such as that described above, a second measure which may be adopted in order to improve the reliability of data exchange, in particular in order to avoid errors due to disturbances, is that of providing a procedure whereby, following transmission of digital information, in particular a packet. For a source to a destination, the destination always provides a response to the source in the form of digital information, in particular a packet; for example, depending on the type of destination, the response may be a simple confirmation of receipt (acknowledgement) or an actual item of data.

In the case where the "master-slave" technique is used, the source is always the central unit of the system and the destination one of the peripheral units of the system.

In a system such as that described above, a third measure which may be adopted to improve the reliability of data exchange, in particular in order to avoid errors due to disturbances, is that of providing that the same digital information is transmitted twice from the same source to the same destination. Typically the information could be sent in succession, where in this case, the destination may consider the transmission valid only if the digital information received coincides. In the case of packet transmission, the source could transmit, for example, twice in succession the same packet to the same destination. It is obvious that this solution results in doubling of the amount of data traffic in the network.

It is also possible for the duplication of the transmission to be performed on the basis of predetermined criteria. For example, a choice which is a good compromise in terms of reliability and traffic is that of repeating the transmission only in relation to specific destinations; for example, the undesired illumination of a luminous signalling device (i.e. without an actual command from the system) is an event which may be acceptable, while the undesired closing of a gate (i.e. without an actual command from the system) is an event which is not acceptable owing to the risk of injury or damage. It is therefore possible, for example, to divide the peripheral units into "high risk" units and "low risk" units and duplicate only the information which is transmitted to the "high risk" units.

In the case where the "master-slave" technique is used, it may be advantageously provided that the only the central unit of the system, namely the "master" automatically transmits twice its digital information, in particular its packets, destined for the peripheral units, namely the "slaves". With regard to the peripheral units, if the central unit, on the basis of predetermined criteria, considers that it is necessary to duplicate transmission it will duplicate interrogation. This could be the case of safety devices, the transmitted data of which is extremely important for the central unit and for the system.

A measure which is quite widely used in order to determine errors in transmission of digital information is the parity bit. Well known in the telecommunications sector, moreover, is the existence of fairly complicated codes which allow the detection and/or correction of one or more transmission errors.

Even if the "master-slave" technique is used, it is not possible to eliminate entirely the risk that two peripheral units may transmit data to the central unit at the same time and therefore generate errors due to overlapping of two transmission operations. This could occur, for example, in the case where, owing to disturbances, two different peripheral units might regard the same packet of digital information as being destined for them.

In a system such as that described above, a fourth measure which may be adopted to improve the reliability of data exchange, in particular in order to detect errors due to overlapping, is that of complicating the structure of the digital information packet: in this case, the packet comprises a data part and a check part. It is highly unlikely that, when receiving digital information resulting from the overlapping of two packets, the data part and the check part will correspond to each other.

If the "master-slave" technique is used, any overlapping generally occurs during response to interrogation by the "master". It may therefore be advantageously decided that the structure of the packet transmitted by the "master" should contain only the data (address+command) plus a parity bit and that the structure of the packet transmitted by a "slave" should contain both a data part and a check part without the parity bit. The check part could be provided in many different ways, and a simple and effective solution will be described below.

The data part and the check part of the packet are chosen with the same length (for example 4 or 8 bits). The source which wishes to send digital information on the network takes a data digital sequence; takes a random digital sequence with the same length as the data (continuously generated in a known manner within the source); generates a digital check sequence by means of an EXCLUSIVE-OR operation between the data sequence and the random sequence; and inserts into the packet the data sequence and the check sequence and transmits the packet over the network. The destination receives the packet and performs the reverse operation (which is again an EXCLUSIVE-OR operation), extracting the digital data sequence transmitted in the absence of overlapping. If overlapping has occurred with a packet transmitted by another unit, the digital sequence extracted by the destination will not correspond to the digital data sequence transmitted, but the destination will be unable to detect this. If the source re-transmits the digital data sequence, the random digital sequence which is used will be different and therefore the second packet transmitted is different. The destination receives a second packet different from the first packet which has not been overlapped or been subject to different overlapping. If there has been no overlapping during both the transmission operations, the destination extracts the same digital sequence, but if, during at least one of the transmission operations, there has been overlapping, the destination obtains two different digital sequences and therefore detects the error.

Another important aspect of an electrical system for controlling a closing element which is moved electrically is safety: it is necessary to prevent the movement of the closing element from inadvertently causing damage to objects and, in particular, injury to persons.

A quite common way of obtaining this result is to identify an area inside which the movement of the closing element occurs and to stop this movement if an object or a person enters into this area.

The safety devices most used for monitoring areas in these applications are photocell systems.

As is well known, a photocell system is composed of a transmitter and a receiver. If the system is correctly installed, when the system is active, the transmitter emits light rays which are received by the receiver; if an object or a person passes in between the transmitter and the receiver, the light rays do not reach the receiver and this situation is signalled by the system.

For proper monitoring of an area it is often necessary to use more than one photocell system and a suitable arrangement along the perimeter.

Figure 8:
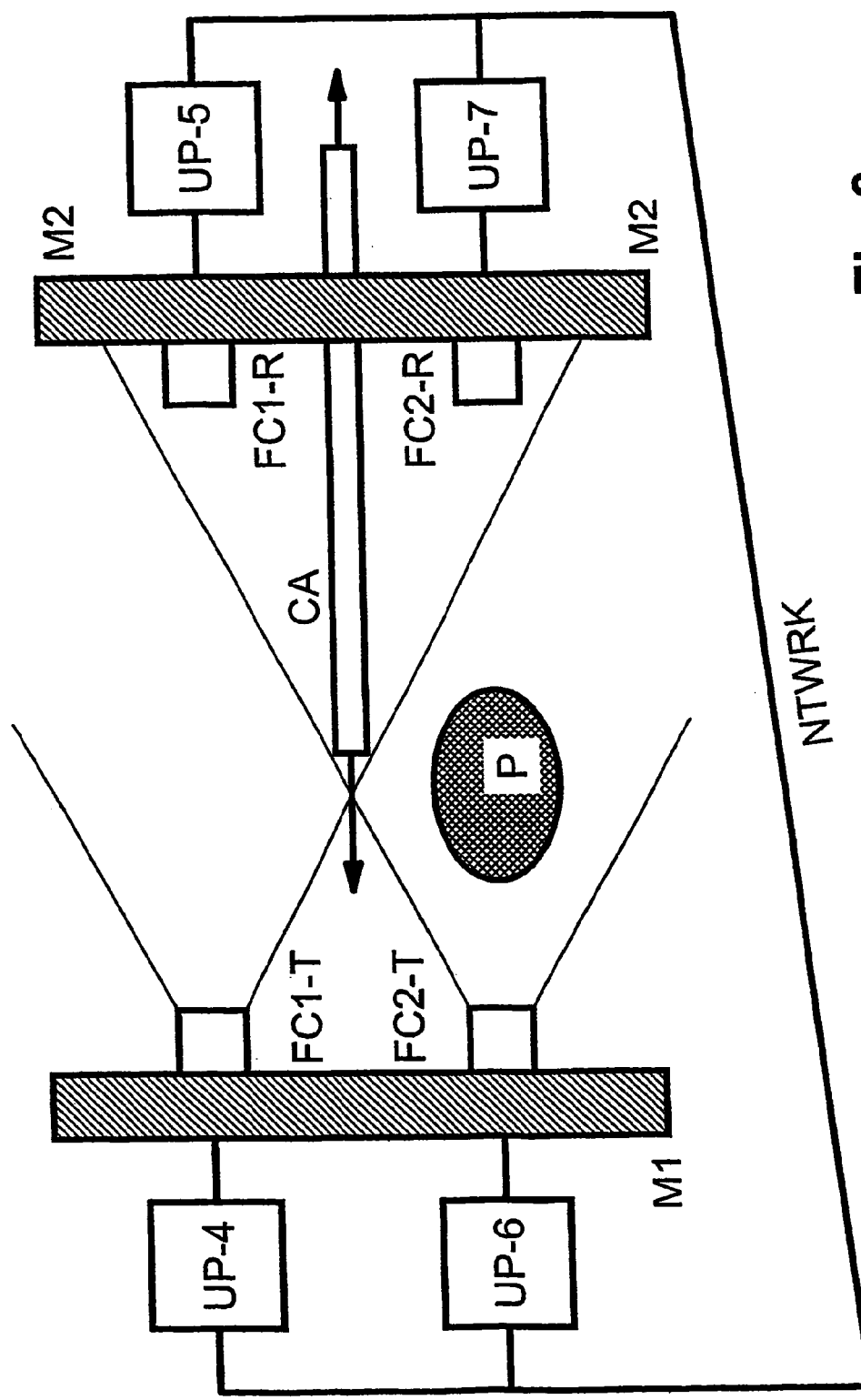
FIG. 8 shows an arrangement of two photocell systems and a diagram for connection to the respective peripheral units of the system, according to the present invention.

FIG. 8 shows, in schematic form, a sliding gate CA located between two walls M1 and M2, two photocell systems FC1, FC2 composed respectively of two transmitters FC1-T,FC2-T and two receivers FC1-R,FC2-R.

Apparently the two photocell systems monitor adequately the area where the gate CA moves. If a person P, for example, crosses the line which joins the transmitter FC2-T and the corresponding receiver FC2-R, the light beam of the photocell system FC2 is interrupted and the gate CA stops.

In reality, the two photocell systems FC1 and FC2 may interfere with each other; in fact, owing to the closeness of the two systems FC1 and FC2, the light rays emitted by the transmitter of one of the two photocell systems reach the receiver of this photocell system, but also the receiver of the other photocell system (albeit with a reduced intensity).

In this case, and as shown in FIG. 8, there is the risk that, even if the person P has entered into the monitored area, the gate CA is not stopped by the electrical control system because the two receivers FC1-R and FC2-R continue to receive light rays.

In order to solve this problem, it is possible to alternate and synchronize operation of the two photocell systems. If we assume that the first photocell system FC1 is made to operate for 10 ms, following which the photocell system FC2 is made to operate for 10 ms, and that this same procedure is continued afterwards, interference between the two systems is avoided.

Obviously this solution may be extended to a greater number of photocell systems.

Synchronization between the photocell systems may be obtained by means of a suitable circuitry connected to them.

With an electrical control system similar to that described above, it is possible to avoid advantageously this additional circuitry, as will be described below with reference to FIG. 8.

Four peripheral units UP-4, UP-5, UP-6, UP-7 of the electrical control system are provided. The peripheral units UP-4, UP-5, UP-6, UP-7 are connected respectively to the transmitter FC1-T, to the receiver FC1-R, to the transmitter FC2-T and to the receiver FC2-R. The central unit of the system is prepared so that it transmits over the network digital information packets at a fixed rate (for example every 30 ms). The four peripheral units UP-4, UP-5, UP-6, UP-7 are arranged so that they detect the packets and extract from this fixed-rate transmission a clock signal with a fixed period (30 ms in the example) which will be identical for all four units, wherein period of the clock signal may be divided into two equal parts. During the first part the system FC1 is activated by the units UP-4 and UP-5 and during the second part the system FC-2 is activated by the units UP-6 and UP-7.

A simple and advantageous manner for achieving this alternation in operation may be the following.

Four unit identification codes are assigned to the four peripheral units UP-4, UP-5, UP-6, UP-7; two odd codes (which are not necessarily different) are assigned to the units UP-4 and UP-5 and two even codes (which are not necessarily different) are assigned to the units UP-6 and UP-7. The units UP-4 and UP-5 will activate respectively the transmitter FC1-T and the receiver FC1-R of the system FC1 during the (odd) sub-period 1 of each period of the extracted clock signal; and the units UP-6 and UP-7 will activate respectively the transmitter FC2-T and the receiver FC2-R of the system FC2 during the (even) sub-period 2 of each period of the extracted clock signal.

Obviously these solutions may be extended to a greater number of photocell systems. Four systems should be sufficient to cover any requirement; in this case the alternation could be obtained by means of the last two bits of the unit identification code.

It must not be forgotten that the sub-period must have a duration which is sufficiently long to allow the reliable detection of an interruption in the light rays and that the period must have a duration which is sufficiently short to comply with the requirements stipulated by the international standards.

The invention claimed is:

1. An electrical system for controlling at least one gate or door moved by means of at least one corresponding electric motor, said electrical system comprising:
   a) an electric network consisting of two electric wires adapted to allow distribution of power supply and digital information;
   b) a central control unit having two terminals adapted to be connected respectively, but indifferently, to said two wires of said network in order to transmit direct-current power supply and to transmit and receive digital information;
   c) three or more peripheral units, each having two terminals adapted to be connected respectively, but indifferently, to said two wires of said network in order to receive direct-current power supply and to receive and/or transmit digital information;
   wherein one of said peripheral units is adapted to be electrically connected to an electric motor for controlling operation thereof;
   wherein one of said peripheral units is adapted to be electrically connected to a device for entering requests of movement of the gate or door;
   wherein one of said peripheral units is adapted to be electrically connected to a safety device for the gate or door;
   wherein the transmission of digital information from said central control unit to said peripheral units takes place in voltage form; and
   wherein the transmission of digital information from said peripheral units to said central control unit takes place in current form.

2. An electrical system for controlling at least one gate or door moved by means of at least one corresponding electric motor, said electrical system comprising:
   a) an electric network consisting of two electric wires adapted to allow distribution of power supply and digital information;
   b) a central control unit having two terminals adapted to be connected respectively, but indifferently, to said two wires of said network in order to transmit direct-current power supply and to transmit and receive digital information;
   c) two or more peripheral units, each having two terminals adapted to be connected respectively, but indifferently, to said two wires of said network in order to receive direct-current power supply and to receive and/or transmit digital information;
   wherein said central control unit is adapted to be electrically connected to an electric motor for controlling operation thereof and/or to a device for entering requests of movement of the gate or door and/or to a safety device for the gate or door;
   wherein a first one of said peripheral units is adapted to be electrically connected to an electric motor for controlling operation thereof and/or to a device for entering requests of movement of the gate or door and/or to a safety device for the gate or door;
   wherein a second one of said peripheral units is adapted to be electrically connected to an electric motor for controlling operation thereof and/or to a device for entering requests of movement of the gate or door and/or to a safety device for the gate or door;

wherein the transmission of digital information from said central control unit to said peripheral units takes place in voltage form; and wherein the transmission of digital information from said peripheral units to said central control unit takes place in current form.

3. An electrical system for controlling at least one gate or door moved by means of at least one corresponding electric motor, said electrical system comprising:

a) an electric network consisting of two electric wires adapted to allow distribution of power supply and digital information;

b) a central control unit having two terminals adapted to be connected respectively, but indifferently, to said two wires of said network in order to transmit direct-current power supply and to transmit and receive digital information;

c) one or more peripheral units, each having two terminals adapted to be connected respectively, but indifferently, to said two wires of said network in order to receive direct-current power supply and to receive and/or transmit digital information;

wherein said central control unit is adapted to be electrically connected to an electric motor for controlling operation thereof and/or to a device for entering requests of movement of the gate or door and/or to a safety device for the gate or door;

wherein one of said peripheral units is adapted to be electrically connected to an electric motor for controlling operation thereof and/or to a device for entering requests of movement of the gate or door and/or to a safety device for the gate or door;

wherein the transmission of digital information from said central control unit to said peripheral units takes place in voltage form; and wherein the transmission of digital information from said peripheral units to said central control unit takes place in current form.

4. The electrical system according to claim 1, wherein said central control unit comprises:

a voltage generator circuit having an output coupled to a first one of said two terminals of said central control unit, and adapted to generate a direct supply voltage, and a modulating circuit coupled between said output and said first one of said two terminals of said central control unit, and adapted to modulate the direct supply voltage through digital information.

5. The electrical system according to claim 4, wherein said central control unit comprises a current detection circuit having an input coupled to a second one of said two terminals of said central control unit, and adapted to extract digital information from the current at its input.

6. The electrical system according to claim 1, wherein each of said peripheral units comprises a polarity adapter circuit having two inputs and two outputs, said two inputs being coupled respectively to said two terminals of a respective one of said peripheral units, and wherein said polarity adapter circuit permits said peripheral units to be connected indifferently to said two electric wires.

7. The electrical system according to claim 6, wherein each of said peripheral units comprises a power supply circuit having inputs coupled respectively to the outputs of said polarity adapter circuit.

8. The electrical system according to claim 6, wherein each of said peripheral units comprises a voltage detection circuit having inputs coupled respectively to the outputs of said polarity adapter circuit and adapted to extract digital information from the voltage at its inputs.

9. The electrical system according to claim 6, wherein each of said peripheral units comprises a load circuit having outputs coupled respectively to the outputs of said polarity adapter circuit and adapted to load the network according to digital information.

10. The electrical system according to claim 1, wherein each of said peripheral units comprises a memory means adapted to store an own unit identification code.

11. The electrical system according to claim 10, wherein the safety device for the gate or door comprises a transmitting section and a receiving section, and wherein two of said peripheral units are adapted to be connected respectively to the transmitting section and to the receiving section and are identified by the same unit identification code.

12. The electrical system according to claim 1, wherein the electrical system is adapted to establish communication between said central control unit and said peripheral units through exchange of packets of digital information according to a "master-slave" technique, wherein said central control unit operates as "master" and said peripheral units operate as "slaves".

13. The electrical system according to claim 12, wherein said central control unit is adapted to transmit packets on said network at a fixed and predetermined rate.

14. The electrical system according to claim 13, wherein the destination of the transmission of a packet by said central control unit is one of said peripheral units chosen on a basis of predetermined criteria.

15. The electrical system according to claim 13, wherein at least one of said peripheral units is adapted to extract timing information from the fixed-rate transmission of packets by said central control unit.

16. The electrical system according to claim 12, wherein the structure of the packets transmitted on said network by said peripheral units is fixed and comprises a data part and a check part.

17. The electrical system according to claim 16, wherein the data part and the check part have the same length, and wherein the check part is the result of an EXCLUSIVE-OR operation between the data part and a random digital sequence having the same length.

18. The electrical system according to claim 12, wherein said central control unit is adapted to perform, during starting and re-starting of the system, identification of all active ones of said peripheral units connected to said network through exchange of packets.

19. The electrical system according to claim 12, wherein said central control unit is adapted to perform, repeatedly during operation of the system, identification of all active ones of said peripheral units connected to said network through exchange of packets in order to identify faults in the system.

20. The electrical system according to claim 1, wherein said central control unit is adapted to transmit the same digital information twice to the same one of said peripheral units on the basis of predetermined criteria.

21. The electrical system according to claim 1, wherein any or each of said peripheral units is adapted to transmit digital information to said central control unit every time it receives digital information destined for it from said central control unit.

22. The electrical system according to claim 1,
wherein a first one of said peripheral units is adapted to be electrically connected to a transmitting section of the safety device,
wherein a second one of said peripheral units is adapted to be electrically connected to a receiving section of the safety device, and
wherein said first and second peripherals units are adapted to extract timing information from a fixed-rate transmission of packets by said central control unit and are further adapted to activate corresponding sections for a first time period of predetermined duration and on the basis of the timing information.

23. The electrical system according to claim 22,
wherein a third one of said peripheral units is adapted to be electrically connected to a transmitting section of another safety device,
wherein a fourth one of said peripheral units is adapted to be electrically connected to receiving section of the other safety device,
wherein said third and fourth peripheral units are adapted to extract timing information from a fixed-rate transmission of packets by said central control unit and are further adapted to activate corresponding sections for a second time period of predetermined duration and on the basis of the timing information, and
wherein the first time period and the second time period do not overlap each other temporally.

24. The electrical system according to claim 2, wherein said central control unit comprises:
a voltage generator circuit having an output coupled to a first one of said two terminals of said central control unit and adapted to generate a direct supply voltage, and
a modulating circuit coupled between said output and said first one of said two terminals of said central control unit, and adapted to modulate the direct supply voltage through digital information.

25. The electrical system according to claim 3, wherein said central control unit comprises:
a voltage generator circuit having an output coupled to a first one of said two terminals of said central control unit, and adapted to generate a direct supply voltage, and
a modulating circuit coupled between said output and said first one of said two terminals of said central control unit, and adapted to modulate the direct supply voltage through digital information.

26. The electrical system according to claim 24, wherein said central control unit comprises a current detection circuit having an input coupled to a second one of said two terminals of said central control unit, and adapted to extract digital information from the current at its input.

27. The electrical system according to claim 25, wherein said central control unit comprises a current detection circuit having an input coupled to a second one of said two terminals of said central control unit, and adapted to extract digital information from the current at its input.

28. The electrical system according to claim 2,
wherein each of said peripheral units comprises a polarity adapter circuit having two inputs and two outputs, said two inputs being coupled respectively to said two terminals of a respective one of said peripheral units, and
wherein said polarity adapter circuit permits said peripheral units to be connected indifferently to said two electric wires.

29. The electrical system according to claim 3,
wherein each of said peripheral units comprises a polarity adapter circuit having two inputs and two outputs, said two inputs being coupled respectively to said two terminals of a respective one of said peripheral units, and
wherein said polarity adapter circuit permits said peripheral units to be connected indifferently to said two electric wires.

30. The electrical system according to claim 28, wherein each of said peripheral units comprises a power supply circuit having inputs coupled respectively to outputs of the said polarity adapter circuit.

31. The electrical system according to claim 29, wherein each of said peripheral units comprises a power supply circuit having inputs coupled respectively to the outputs of said polarity adapter circuit.

32. The electrical system according to claim 28, wherein each of said peripheral units comprises a voltage detection circuit having inputs coupled respectively to the outputs of said polarity adapter circuit and adapted to extract digital information from the voltage at its inputs.

33. The electrical system according to claim 29, wherein each of said peripheral units comprises a voltage detection circuit having inputs coupled respectively to the outputs of said polarity adapter circuit and adapted to extract digital information from the voltage at its inputs.

34. The electrical system according to claim 28, wherein each of said peripheral units comprises a load circuit having outputs coupled respectively to the outputs of said polarity adapter circuit and adapted to load the network according to digital information.

35. The electrical system according to claim 29, wherein each of said peripheral units comprises a load circuit having outputs coupled respectively to the outputs of said polarity adapter circuit and adapted to load the network according to digital information.

36. The electrical system according to claim 2, wherein each of said peripheral units comprises a memory means adapted to store an own unit identification code.

37. The electrical system according to claim 3, wherein each of said peripheral units comprises a memory means adapted to store an own unit identification code.

38. The electrical system according to claim 36,
wherein the safety device for the gate or door comprises a transmitting section and a receiving section, and
wherein two of said peripheral units are adapted to be connected respectively to the transmitting section and to the receiving section and are identified by the same unit identification code.

39. The electrical system according to claim 37,
wherein the safety device for the gate or door comprises a transmitting section and a receiving section, and
wherein two of said peripheral units are adapted to be connected respectively to the transmitting section and to the receiving section and are identified by the same unit identification code.

40. The electrical system according to claim 2, wherein the electrical system is adapted to establish communication between said central control unit and said peripheral units through exchange of packets of digital information according to a "master-slave" techniques wherein said central control unit operates as "master" and said peripheral units operate as "slaves".

41. The electrical system according to claim 3, wherein the electrical system is adapted to establish communication between said central control unit and said peripheral units through exchange of packets of digital information according to a "master-slave" technique, wherein said central control unit operates as "master" and said peripheral units operate as "slaves".

42. The electrical system according to claim 40, wherein said central control unit is adapted to transmit packets on said network at a fixed and predetermined rate.

43. The electrical system according to claim 41, wherein said central control unit is adapted to transmit packets on said network at a fixed and predetermined rate.

44. The electrical system according to claim 42, wherein the destination of the transmission of a packet by said central control unit is one of said peripheral units chosen on a basis of predetermined criteria.

45. The electrical system according to claim 43, wherein the destination of the transmission of a packet by said central control unit is one of said peripheral units chosen on a basis of predetermined criteria.

46. The electrical system according to claim 42, wherein at least one of said peripheral units is adapted to extract timing information from the fixed-rate transmission of packets by said central control unit.

47. The electrical system according to claim 43, wherein at least one of said peripheral units is adapted to extract timing information from the fixed-rate transmission of packets by said central control unit.

48. The electrical system according to claim 40, wherein the structure of the packets transmitted on said network by said peripheral units is fixed and comprises a data part and a check part.

49. The electrical system according to claim 41, wherein the structure of the packets transmitted on said network by said peripheral units is fixed and comprises a data part and a check part.

50. The electrical system according to claim 48, wherein the data part and the check part have the same length, and wherein the check part is the result of an EXCLUSIVE-OR operation between the data part and a random digital sequence having the same length.

51. The electrical system according to claim 49, wherein the data part and the check part have the same length, and wherein the check part is the result of an EXCLUSIVE-OR operation between the data part and a random digital sequence having the same length.

52. The electrical system according to claim 40, wherein said central control unit is adapted to perform, during starting and re-starting of the system, identification of all active ones of said peripheral units connected to said network through exchange of packets.

53. The electrical system according to claim 41, wherein said central control unit is adapted to perform, during starting and re-starting of the system, identification of all active ones of said peripheral units connected to said network through exchange of packets.

54. The electrical system according to claim 40, wherein said central control unit is adapted to perform, repeatedly during operation of the system, identification of all active ones of said peripheral units connected to said network through exchange of packets in order to identify faults in the system.

55. The electrical system according to claim 41, wherein said central control unit is adapted to perform, repeatedly during operation of the system, identification of all active ones of said peripheral units connected to said network through exchange of packets in order to identify faults in the system.

56. The electrical system according to claim 2, wherein said central control unit is adapted to transmit the same digital information twice to the same one of said peripheral units on the basis of predetermined criteria.

57. The electrical system according to claim 3, wherein said central control unit is adapted to transmit the same digital information twice to the same one of said peripheral units on the basis of predetermined criteria.

58. The electrical system according to claim 2, wherein any or each of said peripheral units is adapted to transmit digital information to said central control unit every time it receives digital information destined for it from said central control unit.

59. The electrical system according to claim 3, wherein any or each of said peripheral units is adapted to transmit digital information to said central control unit every time it receives digital information destined for it from said central control unit.

60. The electrical system according to claim 2,
wherein a first one of said peripheral units is adapted to be electrically connected to a transmitting section of the safety device,
wherein a second one of said peripheral units is adapted to be electrically connected to a receiving section of the safety device, and
wherein said first and second peripherals units are adapted to extract timing information from a fixed-rate transmission of packets by said central control unit and are further adapted to activate corresponding sections for a first time period of predetermined duration and on the basis of the timing information.

61. The electrical system according to claim 3,
wherein a first one of said peripheral units is adapted to be electrically connected to a transmitting section of the safety device,
wherein a second one of said peripheral units is adapted to be electrically connected to a receiving section of the safety device, and
wherein said first and second peripherals units are adapted to extract timing information from a fixed-rate transmission of packets by said central control unit and are further adapted to activate corresponding sections for a first time period of predetermined duration and on the basis of the timing information.

62. The electrical system according to claim 60, wherein a third one of said peripheral units is adapted to be electrically connected to a transmitting section of another safety device,
wherein a fourth one of said peripheral units is adapted to be electrically connected to receiving section of the other safety device,
wherein said third and fourth peripheral units are adapted to extract timing information from a fixed-rate transmission of packets by said central control unit and are further adapted to activate corresponding sections for a second time period of predetermined duration and on the basis of the timing information, and
wherein the first time period and the second time period do not overlap each other temporally.

63. The electrical system according to claim 61, wherein a third one of said peripheral units is adapted to be electrically connected to a transmitting section of another safety device,
   wherein a fourth one of said peripheral units is adapted to be electrically connected to receiving section of the other safety device,
   wherein said third and fourth peripheral units are adapted to extract timing information from a fixed-rate transmission of packets by said central control unit and are further adapted to activate corresponding sections for a second time period of predetermined duration and on the basis of the timing information, and
wherein the first time period and the second time period do not overlap each other temporally.

\* \* \* \* \*